United States Patent [19]

Wiser

[11] 4,086,720
[45] May 2, 1978

[54] DEVICE FOR ATTRACTING AND ELIMINATING FLYING INSECTS

[76] Inventor: John A. Wiser, P.O. Box 192, Liberty, Tex. 77575

[21] Appl. No.: 733,538

[22] Filed: Oct. 18, 1976

[51] Int. Cl.² ............................................. A01M 1/04
[52] U.S. Cl. ...................................... 43/113; 362/96; 362/802
[58] Field of Search ................. 43/107, 113, 124, 131, 43/132 A, 132 R; 240/2 FD, 2 LC, 2 LF

[56] References Cited

U.S. PATENT DOCUMENTS

| | | | |
|---|---|---|---|
| 2,731,762 | 1/1956 | Jones | 43/113 |
| 3,174,688 | 3/1965 | Chatten | 240/10 R |
| 3,644,726 | 2/1972 | Pfeuffer | 240/10 R |
| 3,793,515 | 2/1974 | Park | 240/10 R |

Primary Examiner—Louis G. Mancene
Assistant Examiner—Robert P. Swiatek
Attorney, Agent, or Firm—Kenneth H. Johnson

[57] ABSTRACT

A device to attract flying insects by light, the light source being enclosed in a light transmitting body and about the body a curtain of liquid raining down to contact the insects trying to reach the light source, thereby drowning the insects or killing them with substances contained in the liquid. The liquid is recaptured in a reservoir below the light source and recirculated by pump means to the curtain of liquid drops.

3 Claims, 7 Drawing Figures

DEVICE FOR ATTRACTING AND ELIMINATING FLYING INSECTS

BACKGROUND OF THE INVENTION

The present invention relates to a device which attracts and eliminates, i.e., kills insects. In particular, the present device is useful for eliminating flying night insects.

There is a variety of devices which have been developed for this same purpose. They may be divided into two basic attraction types: (1) the type which employs light to attract insects and (2) those which employ scents. There are also hybrids of both types.

The devices may also be classified by the methods used to eliminate the insects: (1) electrocution (2) drowning (3) burning (4) entrapment and (5) insecticides or combinations.

The most commercially successful devices now on the market are light attraction-electrocution. Such lights are very well adapted for industrial or farm utilization, where they are safely installed and must deal with large numbers of insects, such as in barns. However, in home use, they are hazardous, not only to children, but to adults. The danger of electrocution to humans may preclude their utilization in homes. Moreover, the sharp crack of the electrocution of the insect can be a disquieting sound on a patio or porch.

Some U.S. Patents which demonstrate the various combinations described above are U.S. Pat. Nos. 1,721,872 to Patterson—light, burning; 1,723,919 to Bykowy—light, entrapment; 1,813,648 to Watson—light, drowning or burning; 1,839,247 to Moore—light, semi-burning or entrapment, electrocution; 1,996,293 to House—light, drowning; 2,608,022 to Wright—light, electrocution; 2,799,116 to Leftwich—scent, light, insecticide; 3,187,458 to Densmore—light, scent, insecticide; 3,487,577 to Sexton—light, intermittent insecticide spray; and 3,513,585 to Ross—light, drowning.

The present invention has as one of its objects the provision of a safer device than those which electrocute insects or spray insecticide into the atmosphere.

It is a further object of the present invention to provide a device that employs light to attract insects and may also employ odor or scent attraction.

It is another object of the present invention to obtain if desired, as will be apparent hereinafter, the benefits of insecticide insect destruction.

It is also an object to provide a device which will drown insects.

It is a particular advantage of the present invention that a reservoir is provided for reuse of fluid used to destroy the insects.

It is a particular and unique feature of the present invention that the device in operation is attractive and interesting to observe in an aesthetic sense.

The objects, advantages and features set forth, as well as others, which will be noted, will become clear from the following descriptions.

SUMMARY OF THE INVENTION

Figure 1:
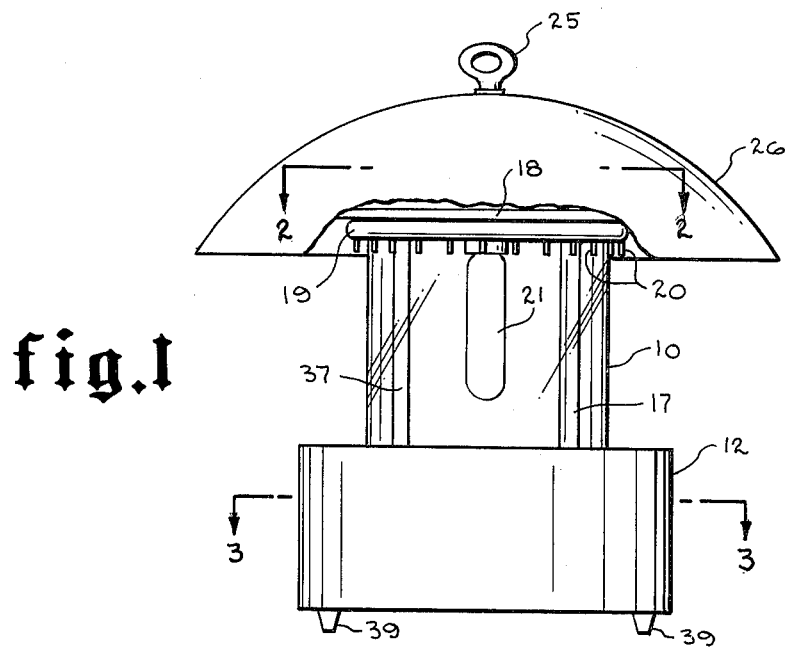
FIG. 1 is a elevational view of the invention with a portion cut away to illustrate one aspect of the construction.
Figure 5:
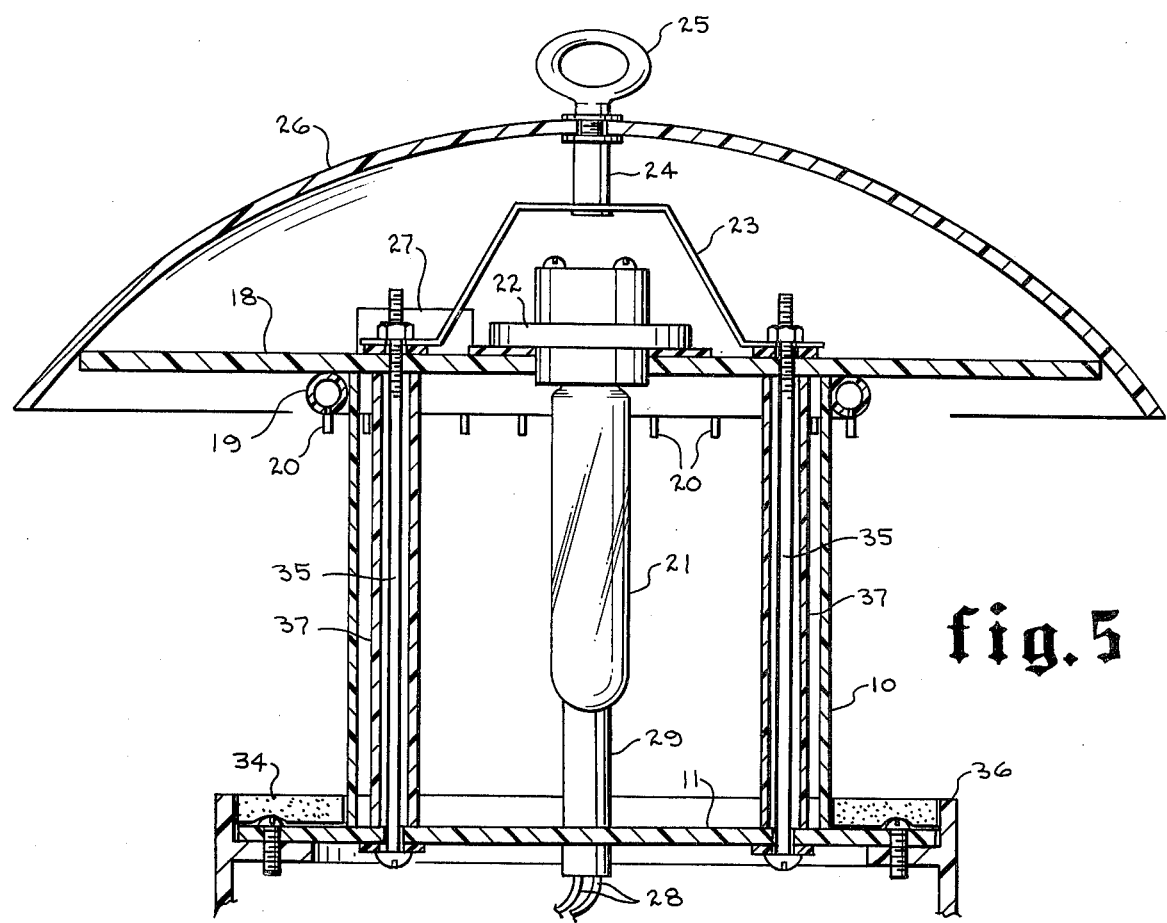
FIG. 5 is an elevation cross-section of a portion of the device taken on lines 5—5 of FIG. 2, viewed in the direction of the arrows.
Figure 2:
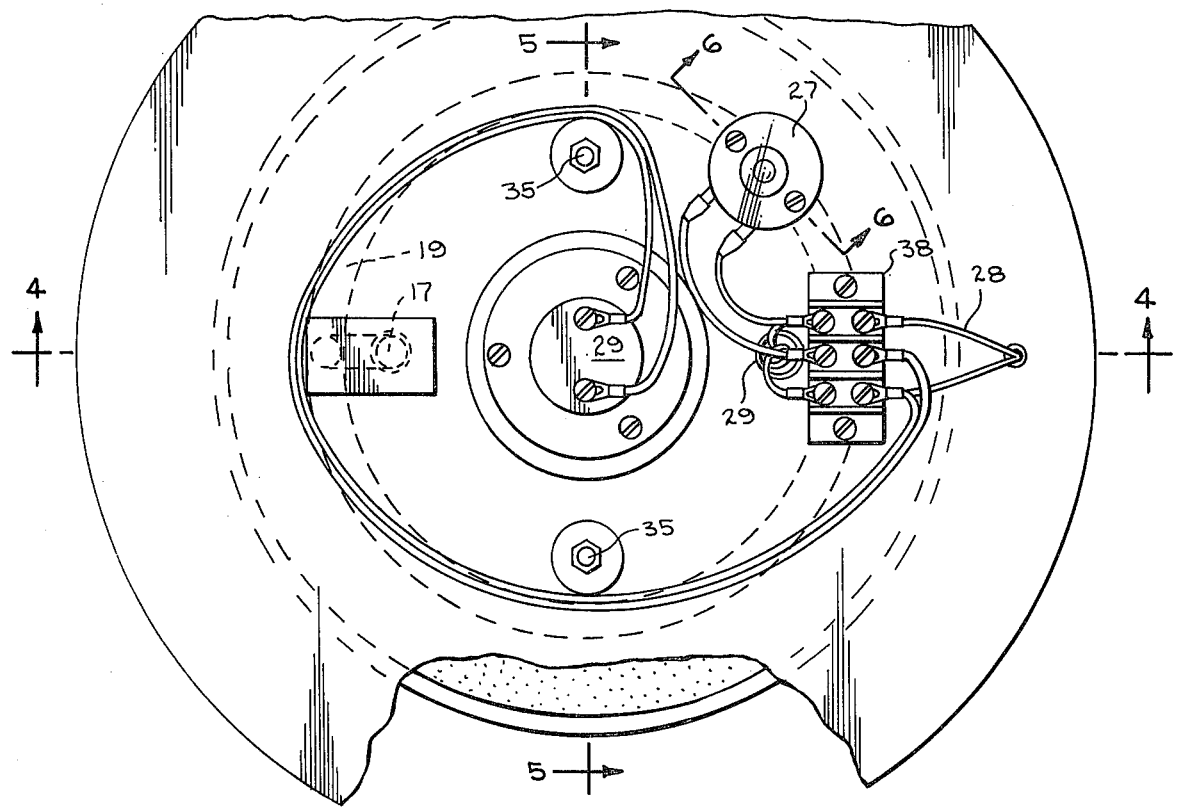
FIG. 2 is a cross-sectional view of the device taken on lines 2—2 of FIG. 1 in the direction of the arrows with a portion cut away to illustrate the relative placement of another portion of the device.
Figure 3:
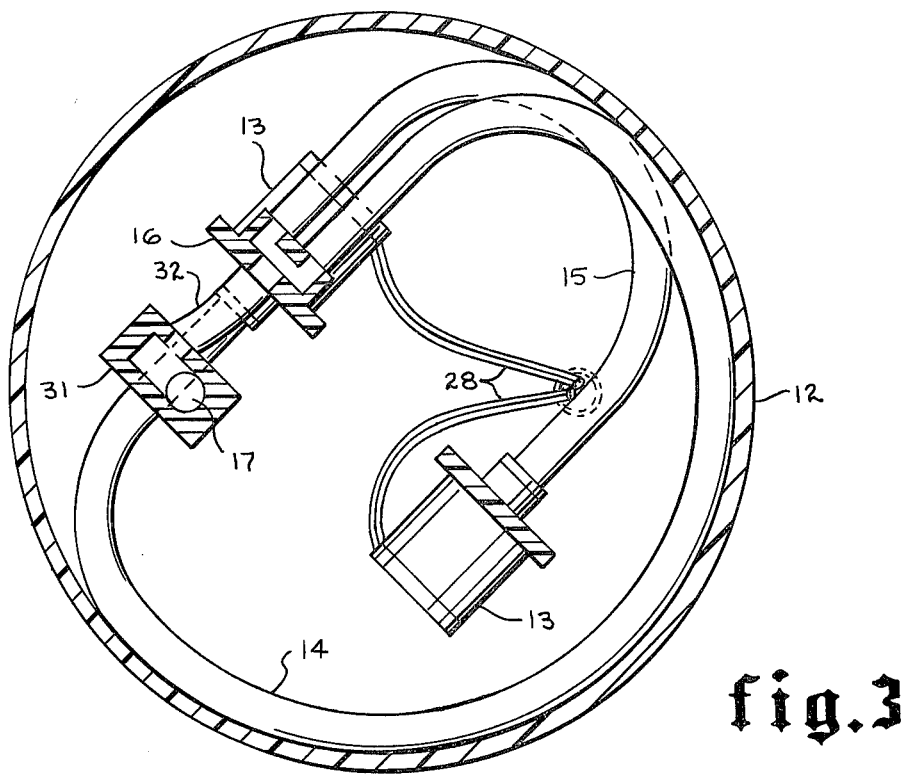
FIG. 3 is a cross-sectional view taken on lines 3—3 of FIG. 1, viewed in the direction of the arrows illustrating a reservoir and pump arrangement.

Briefly, the invention is a device to attract and eliminate insects, which comprises an enclosed body through which light will pass, i.e., clear or translucent, in which is mounted a light source, located about the upper periphery and external of the enclosed body in a first conduit, there being a plurality of openings spaced about the conduit, said enclosed body being mounted to a liquid reservoir or tank, on a surface of the reservoir or tank extending laterally on all sides beyond the enclosed body and the first conduit, said laterally extending surface having openings thereon into the reservoir or tank, said first conduit being attached by a second conduit to pump means operably associated with the reservoir or tank, for pumping a liquid contained in the reservoir or tank through said second conduit into said first conduit where the liquid falls from the plurality of openings in said first conduit onto the laterally extending surface of the tank or reservoir, and through the openings therein back into the reservoir.

In preferred embodiments, and also probably in the most reasonable embodiments, the openings in the first conduit will be located toward the reservoir tank, i.e., downward. The openings on the first conduit may be evenly spaced about the conduit or may be unevenly spaced, however, it is contemplated that the most useful device will have substantially even spacing of the openings and they will be of substantially the same size. The size of the openings is adjustable in accordance with the desire of the practitioner to achieve a series of drops of liquid falling from the openings or a steady stream. Similarly the openings of the lateral surface of the tank, will be such as to allow all of the liquid passing through the conduit onto the lateral surface to fall back into the tank without flowing off of the lateral surface. To aid in preserving the liquids or returning them to the reservoir, a wall or other retaining type of means may be affixed about the periphery of the laterally extending surface. There may also be tubes extending from the openings in the first conduit in order to direct the flow of the liquid. There is also preferably a filter means located about the laterally extending surface in order to prevent insects from passing through the openings and into the reservoir. This also facilitates cleaning the device of dead bugs by simply removing the filter means and rinsing it or disposing of it.

In operation the pumping means runs continuously, hence the pumping means is preferably electric, similarly the light source is preferably electric. Selection of the appropriate pumping means for the proper pressure and capacity, is not the subject matter of this invention and is not anything more than the routine mechanical adaption of the disclosed invention to the desired performance. Preferably electrical immersion pumps are located within the reservoir or tank.

Briefly, in operation the liquid in the reservoir is pumped through the second conduit into the first conduit and drops through the openings which, if evenly spaced, and of sufficient number, form a liquid curtain about the enclosed body and light source. The light within the enclosed body is operating simultaneously so as to attract insects, probably flying insects for the greatest part, which when they strike the enclosed body, will become saturated with the liquid. The liquid may contain a insecticide such as lindane or chlordane, or any other approved commercial insecticide, however this is not necessary. The liquid may also contain a surfactant which will make the insects more susceptible to drowning in the liquid. More preferably the liquid is water containing a surfactant so as to be innocuous. Surfactants, of course, include ordinary detergents, however such materials might tend to foam, thus it would be best to employ the non-foaming types of detergents, many of which are listed in McCutcheon's Detergents & Emulsifiers, 1973 North American Addition, published by McCutcheon's Division, Allured Publishing Corporation, New Jersey, which is incorporated herein. Also, as noted above, insect attracting scents may be added to the liquid to attract the insects to the lamp for their elimination to maintain the adjacent area free of insects.

The effect of the lamp in operation, is not unlike decorative lamps known as "rain lamps," which serve no useful purpose and operate in a different fashion than disclosed herein, but it is a benefit of the present lamp that in addition to its insect attracting and killing properties, it does have a certain pleasant appearance as the drops or streams of water cascade down from the openings in the first conduit.

DETAILED DESCRIPTION OF THE INVENTION AND PREFERRED EMBODIMENT

Figure 4:
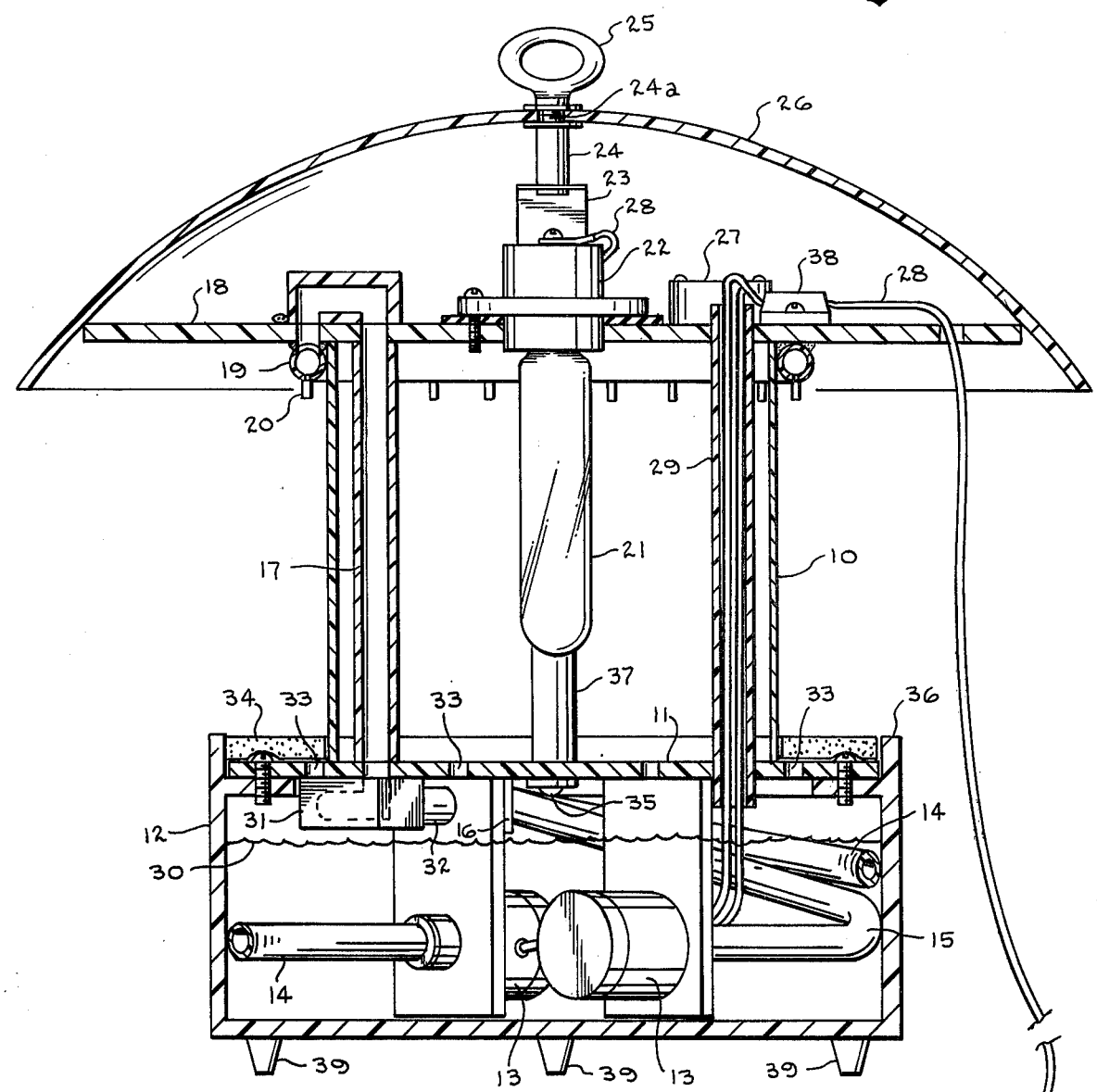
FIG. 4 is an elevation cross-sectional view of the device taken on lines 4—4 of FIG. 2, viewed in the direction of the arrows.

Reference is made to FIG. 4, wherein substantially all of the elements relevant to the enabling description of the present invention may be seen. The enclosed body 10 (which in this embodiment is a cylinder of acrylic plastic) is attached by means of a solvent weld to plate 11 which forms the laterally extending surface of the reservoir 12. The reservoir 12 is shown containing a liquid of level 30.

Located in the reservoir and below the liquid level, are two pumps 13. In the present embodiment, the pumping means is comprised of two pumps, however one pump or more than two pumps could be used. The two pumps 13 work in parallel. The two pumps are immersion types and draw the liquid from the reservoir into the body of the pump as is conventional and force it out through the tubes 14 and 15 respectively. Both tubes, 14 and 15, are connected into manifold 16, which is connected to conduit 32, hence into chamber 31 which is connected via conduit 17 to tube 19. The tube 19 is a toroidal ring which has located about its lower surface, a plurality of openings into which have been fitted spigots 20. In this embodiment, the spigots (openings therein) are all of the same size and equally spaced about the lower surface of the tube 19.

Attached at the upper end of the cylinder 10, is a plate 18 through which conduit 17 passes. Plate 18 forms a cover for the enclosed body and provides a member onto which the electric light 21 is mounted by means of electrical socket 22.

Aligned below spigots 20, is the portion of plate 11 which has a plurality of openings thereabout connecting into the reservoir. Also a portion of the reservoir 12 extends upward past the plate 11 forming a retaining wall 36 to prevent a liquid from running off of the plate 11 as will be described hereinafter. Located about the portion of the plate 11 which extends beyond the cylinder 10 up to the retaining wall 36, is a filter 34. The filter may be of any conventional material such as cloth, fiber glass, reticulated foamed polymeric material, felt, etc.

An electrical cord 28 provides electricity to operate the electric light and the electric pumps which are connected thereto by other electrical lines 28 (a description of the electrical circuitry will be setforth below shortly in regard to FIG. 7). The upper portion of the device, including the electrical components, are preferably enclosed under a cover 26 which may be a hemispherical shape. The cover is mounted to stem 24 over a threaded upper portion, (all of which is not shown) 24a. The cover is held onto the stem 24 by a decorative-nut handle 25. The stem 24 is attached by a bracket 23 to plate 18.

The electrical cord 28, which provides power to the pumps, passes through the conduit 29 from the upper portion of the device into the reservoir.

Bolts 35 pull the plate 18 and plate 11 towards each other and against the centrally located cylinder 10. The bolts are located in conduits 37 which provide a symetrical appearance with the two functional conduits described above, i.e., 17 and 29. The entire device may be mounted on legs 39 which may conveniently be made of a vibration and shock absorbent material such as rubber, in order to mute the sound of the pumps.

Figure 6:
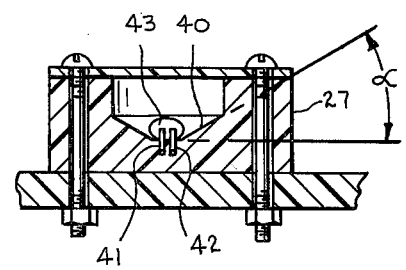
FIG. 6 is a cross-section detail of a novel mercury safety switch taken on lines 6—6 of FIG. 2, viewed in the direction of the arrows.

The mercury switch 27 which is shown in more detail in FIG. 6, is a simple but very effective device. It is connected as shown in FIG. 7, in series with all of the other electrical components of the present device. The safety switch is described in more detail in applicant's copending application, Ser. No. 733,539 filed Oct. 18, 1976, Mercury Switch filed on even date herewith, which disclosure is incorporated in full in this application. Briefly the mercury switch consists of a cup 40 which has a frusto conical shape with the angle of the sides determining the degree off vertical which the apparatus, or device, in this case, the lamp, may be tilted before the mercury metal 43 moves off of one or both of the electrical leads 41 and 42, thereby breaking the electrical circuit and deactivating the electrical components within the device.

The shape of the chamber is critical since a purpose of the switch is to provide a complete and positive break in an electrical circuit, hence the frusto conical section provides a flat base where the electrodes enter the chamber and in the horizontal position the mercury will contact both electrodes and complete the circuit. If the switch is tilted in any direction, to the point where a portion of the cone surface is horizontal and the base of the chamber is not horizontal, the mercury will flow by gravity on to cone surface. The mercury may move from the electrodes and break the electrical circuit before any portion of the cone surface is horizontal. The likelihood of premature circuit breaking can depend on the relative location of the electrodes in the base, the length of the electrodes, external jarring of the switch and other factors, however, this is not significant since it is the purpose of the switch to cut off when it is tilted out of the horizontal position and to provide a positive cut off at least at some maximum point of tilt. The complete and absolute cut off will come when the mercury flows onto the cone surface. The degree of tilt required for complete cut off, i.e., breaking of the circuit is adjustable by the angle (alpha) between the base of the cone section and the wall of the frusto conical section. Greater angles require more tilting to make a portion of cone surface horizontal.

The non-conducting material of the body of the switch may be ceramic, glass, plastic or the like. The electrodes may be copper, lead, steel, aluminum, silver, platinum, an alloy or any conducting material.

The mercury metal employed is as pure as possible or otherwise suitable for electrical purposes. The amount of mercury is critical for several reasons. The first is that it must be sufficient to contact both electrodes when the base is horizontal. If the mercury does not substantially cover the base in the horizontal position, then premature circuit breaking as discussed above, will tend to occur as the mercury moves over the base. However, where the mercury covers substantially the entire base, it can only move against the cone surface in tilting and not off of the base until the cone surface is horizontal or substantially so.

The quantity of mercury may be such as to cover the base and some portion of the cone surfaces when the base is horizontal but, of course it is substantially less than the capacity of the chamber. The maximum amount of mercury which may be present is that which completely will be free of at least one electrode when a portion of the cone surface is horizontal, preferably both electrodes are not in contact with the mercury at that time. In a preferred embodiment the quantity of mercury is that required to substantially cover the base and only the base when said base is horizontal.

Figure 7:
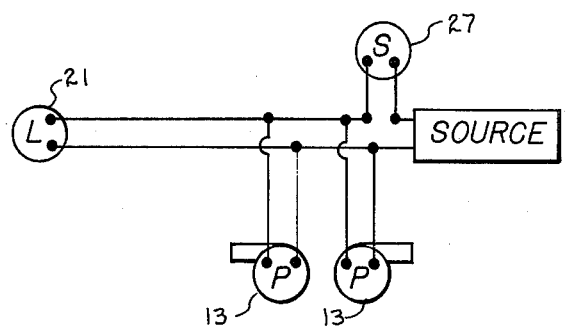
FIG. 7 is a schematic representation of the electrical circuit employed in the device.

The electrical circuitry is shown in FIG. 7, each of the light 21 and pumps 13 are connected in parallel to each other and in series to the mercury switch 27. The electrical circuitry is extremely simple and requires no further explanation.

In operation, the lamp is filled with a liquid, for example, water to the level 30 (and maintained at this level or a level at least above the pumps during the entire operation). When the electrical cord is attached to an electrical source, the light 21 and the pumps 13 are operational and liquid is pumped by the pumps from the reservoir through tubes 14 and 15 and to the manifold 16. Hence, from there through conduit 32 into chamber 31 and hence up conduit 17 and into tube 19. The water either falls by gravity or is forced under pressure (depending on the rate of the operation of the pumps) through spigots 20. The fluid falls onto the filter 34 and plate 11 and through the opening 33 back into the reservoir.

At night, the light source will attract insects which will fly against the cylinder 10 and in their fluttering onto the filter 34 where they become doused with the liquid which preferably contains some substance to either poison the insect or make the insect more susceptible to drowning. The insects may flutter away from the device and die adjacent thereto or may die on the filter 34, which prevents their falling through the openings into the reservoir. By proper adjustment of the rate of liquid pumped to the tube 19 and the openings therein, a rain drop effect can be created.

Alternatively, of course, the spigots could be closer together and directed to the cylinder 10 so as to form a surface of liquid over the cylinder such that the insects would contact the fluid and be washed off the surface when they flew against the cylinder 10. Either approach is operable, however, the rain effect detailed above is preferable because of its interesting appearance and because the insects are not prohibited to a great extent from getting as close to the light source as possible and it is during their fluttering that they incidently come in contact with the dropping liquid.

The openings or spigots about tube 19 may be substantially equally spaced at intervals in the range of 5° to 15° apart about the circumference of tubes having circumferences in the range of 10 to 30 inches and proportional intervals for tubes of larger or smaller circumference. The openings need not extend around the entire tube, for example there may be one or two small areas which have no openings where the pump lines tie into the tube. However, to achieve the purposes of the present invention, these areas are held to a minimum in number and size. Such a gap may also be considered merely as an irregular spacing in an otherwise substantially regular spacing of openings about the tube circumference.

In the course of operation, liquid could be lost, e.g., by evaporation. Make-up liquid is easily added by pouring it onto surface 11, from which it passes by openings 33 into the reservoir.

The invention claimed is:
1. A device for attracting and eliminating flying insects comprising:
 a cylindrical clear or translucent body,
 a light source mounted within said body for attracting insects,
 a tube mounted about the upper periphery external of said body and extending beyond said body, said tube having a plurality of openings thereon and spaced about the body,
 a liquid reservoir, said body being substantially centrally mounted to the liquid reservoir on a surface extending laterally beyond said body and said tube, said surface having an opening thereon into said reservoir, said openings in said tube being positioned to allow liquid to fall therefrom on to said laterally extending surface,
 a pump means located within said reservoir,
 a conduit connected to said pump means and to said tube for carrying pumped liquid from said reservoir to said tube,
 said light source and pump means being electric,
 means for supplying electricity to said light source and pump means, and
 a safety means being connected in series to said light source and pump means for deactivating an electric circuit when the horizontal position of said device is changed a predetermined amount in any direction.

2. The device according to claim 1 wherein said openings in the tube are substantially equally spaced about the circumference of the tube.

3. The device according to claim 2 having a filter means on said laterally extending surface.

* * * * *